United States Patent
Gamero Mendez et al.

(10) Patent No.: US 11,243,119 B2
(45) Date of Patent: Feb. 8, 2022

(54) PROTECTIVE SLEEVE FOR A COMPONENT OF A TURBINE ENGINE AND METHOD OF INSTALLING THE SAME

(71) Applicant: General Electric Company, Schenectady, NY (US)

(72) Inventors: Jose Mikhail Gamero Mendez, Queretaro (MX); Miroslava Franco Barrera, Queretaro (MX); Juan Cristobal Carrasco Alvarez, Queretaro (MX); Jose Gutierrez Aguilar, Queretaro (MX); Cesar Octavio Vazquez Carmona, Queretaro (MX); Marisol Alonso Rodriguez, Queretaro (MX)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 5 days.

(21) Appl. No.: 16/790,910

(22) Filed: Feb. 14, 2020

(65) Prior Publication Data
US 2021/0255044 A1 Aug. 19, 2021

(51) Int. Cl.
*G01K 1/08* (2021.01)
*G01K 7/00* (2006.01)
(Continued)

(52) U.S. Cl.
CPC .................. *G01K 1/12* (2013.01); *F02C 7/00* (2013.01); *G01K 7/02* (2013.01); *F05D 2230/60* (2013.01);
(Continued)

(58) Field of Classification Search
USPC .......................... 374/144, 209, 208, 158, 179
See application file for complete search history.

(56) References Cited

U.S. PATENT DOCUMENTS 3,653,976 A  4/1972  Miller et al.
4,499,330 A  2/1985  Pustell
(Continued)

FOREIGN PATENT DOCUMENTS

CN  102589996 B  5/2014
CN  104896261 A  9/2015
(Continued)

OTHER PUBLICATIONS

Extended European Search Report for Patent Application EP 21154147.9 dated Jul. 9, 2021; 11 pp.

*Primary Examiner* — Mirellys Jagan
(74) *Attorney, Agent, or Firm* — Armstrong Teasdale LLP

(57) ABSTRACT

A sleeve for a probe of an environment-sensing device is provided. The sleeve includes a first portion and a second portion. The first portion includes a first inner surface, a first outer surface, a first body extending between the first inner surface and the first outer surface, at least one first body channel, and a first-portion projection extending axially along the first portion. The second portion includes a second inner surface, a second outer surface, a second body extending between the second inner surface and the second outer surface, at least one second body channel, and a second-portion receiving channel extending axially along the second portion. The at least one first body channel and at least one second body channel include a filler material. The first portion and the second portion are configured to couple together by mating the first-portion projection with the second-portion receiving channel.

17 Claims, 13 Drawing Sheets

(51) Int. Cl.
    *G01K 13/00*         (2021.01)
    *G01K 1/12*          (2006.01)
    *F02C 7/00*          (2006.01)
    *G01K 7/02*          (2021.01)

(52) U.S. Cl.
    CPC ...... *F05D 2260/80* (2013.01); *G01K 2205/00* (2013.01)

(56) References Cited

U.S. PATENT DOCUMENTS

| | | | | |
|---|---|---|---|---|
| 4,538,927 | A * | 9/1985 | Jochemczyk | G01K 7/02 374/163 |
| 5,185,996 | A | 2/1993 | Smith et al. | |
| 6,169,244 | B1 * | 1/2001 | Carlos | G01K 1/08 118/715 |
| 6,639,505 | B2 * | 10/2003 | Murata | G01K 7/22 338/25 |

FOREIGN PATENT DOCUMENTS

| | | |
|---|---|---|
| CN | 105181164 A | 12/2015 |
| CN | 109611648 A | 4/2019 |
| CN | 209589274 U | 11/2019 |
| CZ | 2006211 A3 | 10/2007 |
| DE | 2943123 A1 | 5/1981 |
| DE | 29601458 U1 | 3/1996 |
| DE | 102016111444 A1 | 12/2017 |
| EP | 2302277 A2 | 3/2011 |
| EP | 3483398 A1 | 5/2019 |
| GB | 1589475 A | 5/1981 |
| GB | 2296749 A | 7/1996 |
| JP | S57155442 U | 9/1982 |
| JP | 2007194148 A | 8/2007 |

\* cited by examiner

PROTECTIVE SLEEVE FOR A COMPONENT OF A TURBINE ENGINE AND METHOD OF INSTALLING THE SAME

BACKGROUND

The present disclosure relates generally to protective coverings for components in high-heat environments and, more specifically, to sleeves for protecting temperature probes within high temperature portions of a gas turbine engine.

At least some known turbine engines include a compressor, a combustor, and a turbine coupled together in a serial flow relationship. Compressed air is discharged from the compressor, mixed with fuel, and ignited in the combustor to form a high energy gas stream. The high energy gas stream flows through the turbine to rotatably drive the turbine, creating a high temperature environment within and downstream of the combustor and turbine.

In at least some known turbines, sustained high temperatures in the hot flow path can damage components, such as turbine blades. Similarly, in at least some known gas turbines engines, the temperature of the fuel burning within the compressor and the turbine can affect the emissions downstream of the turbine. Accordingly, to monitor the temperature within the gas turbine environment, at least some known turbine engines utilize temperature probes to monitor temperatures within the turbine. More specifically, at least some known turbine engines utilize thermocouples to monitor the temperature within the turbine.

At least some known thermocouples for turbine engines include a probe configured to extend within the hot flow path. The thermocouple probe can be subjected to thermal and/or fluid pressure stresses and strains. For example, in at least some known turbine engines, the thermocouple probe is located adjacent a radiation shield. Exposure to the thermal and/or mechanical stresses and strains within the hot flow path can cause damage to the outer covering of the probe, such as by fretting against the radiation shield or from leakage of hot gas from the exhaust into portions of the thermocouple. Such damage to the thermocouple probe requires costly replacement of the thermocouple and can lead to increased downtime of turbine engine if the thermocouple needs to be removed and replaced.

BRIEF DESCRIPTION

In one aspect, a sleeve for a probe of an environment-sensing device is provided. The sleeve includes a first portion and a second portion. The first portion includes a first inner surface, a first outer surface, a first body extending between the first inner surface and the first outer surface, at least one first body channel defined within the first portion, and a first-portion projection extending axially along the first portion. The second portion includes a second inner surface, a second outer surface, a second body extending between the second inner surface and the second outer surface, at least one second body channel defined within the second portion, and a second-portion receiving channel extending axially along the second portion. The at least one first body channel and at least one second body channel including a filler material. The first portion and the second portion are configured to couple together by mating the first-portion projection with the second-portion receiving channel.

In another aspect, a gas turbine is provided. The gas turbine includes an air compressor, a combustor, a turbine arranged in flow communication with the air compressor and the combustor along a flow path, a component arranged along said flow path, and a sleeve for the component. The sleeve includes a first portion and a second portion. The first portion includes a first inner surface, a first outer surface, a first body extending between the first inner surface and the first outer surface, at least one first body channel defined within the first portion, and a first-portion projection extending axially along the first portion. The at least one first body channel includes a filler material therein. The second portion includes a second inner surface, a second outer surface, a second body extending between the second inner surface and the second outer surface, at least one second body channel defined within the second portion, a second-portion receiving channel extending axially along the second portion. The at least one second body channel includes the filler material therein. The first portion and the second portion are mated together around the component with the first-portion projection extending into the second-portion receiving channel.

In a further aspect, a method for placing a protective sleeve around a component of a gas turbine is provided. The sleeve includes a first portion and a second portion. The first portion has at least one first body channel defined therein and a first-portion projection extending axially along the first portion. The at least one first body channel includes a filler material therein. The second portion has at least one second body channel and a second-portion receiving channel extending axially along the second portion. The at least one second body channel includes the filler material therein. The method includes mating the first-portion projection with the second-portion receiving channel, forming the protective sleeve. The method further includes placing the protective sleeve around the component such that an inner surface of the sleeve contacts the component.

DRAWINGS

DETAILED DESCRIPTION

Figure 1:
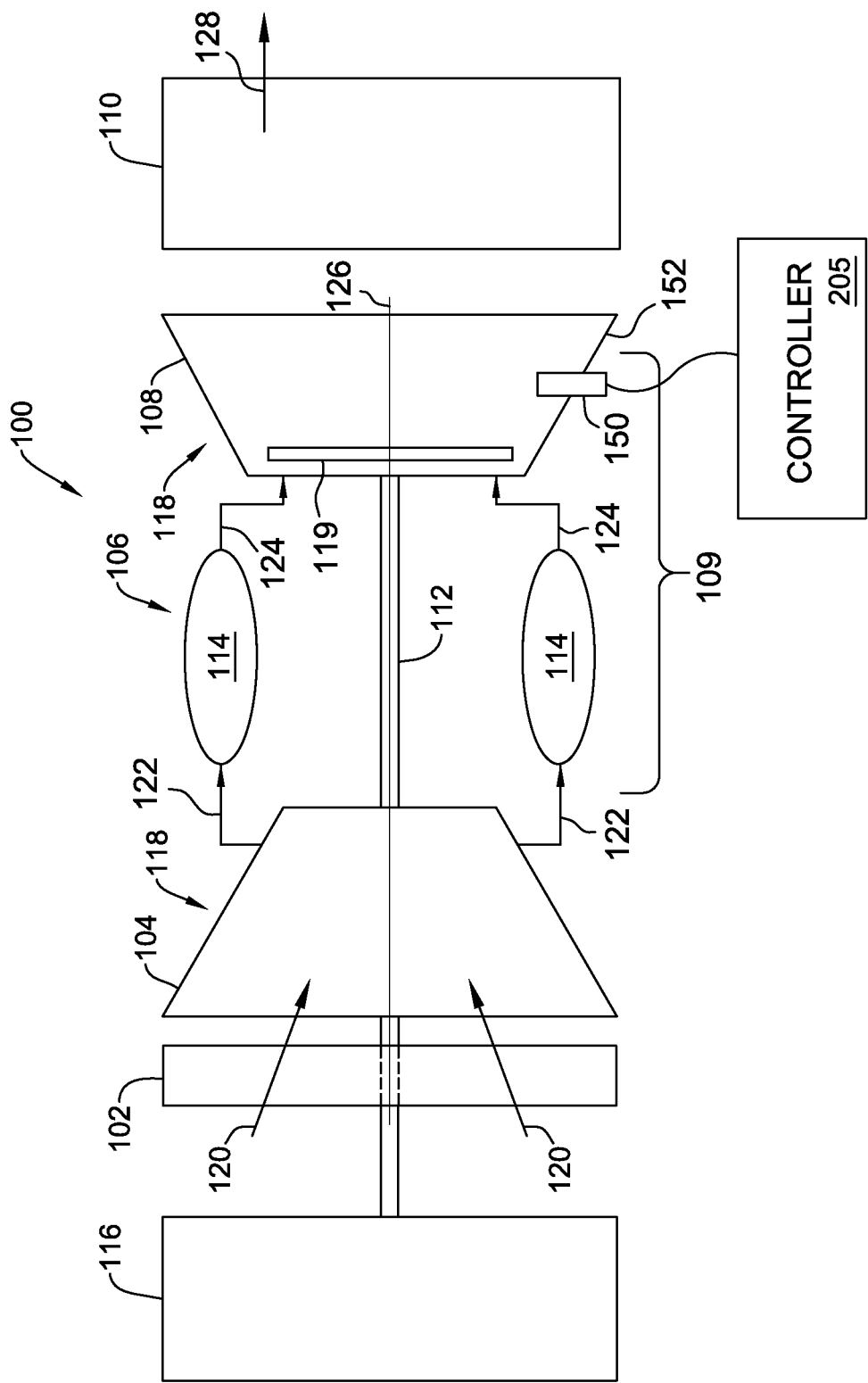
FIG. 1 is a schematic illustration of a turbine engine assembly.

In the following specification and the claims, reference will be made to a number of terms, which shall be defined to have the following meanings.

The singular forms "a", "an", and "the" include plural references unless the context clearly dictates otherwise.

Unless otherwise indicated, approximating language, such as "generally," "substantially," and "about," as used herein indicates that the term so modified may apply to only an approximate degree, as would be recognized by one of ordinary skill in the art, rather than to an absolute or perfect degree. Accordingly, a value modified by a term or terms such as "about," "approximately," and "substantially" is not to be limited to the precise value specified. In at least some instances, the approximating language may correspond to the precision of an instrument for measuring the value. Here and throughout the specification and claims, range limitations may be identified. Such ranges may be combined and/or interchanged, and include all the sub-ranges contained therein unless context or language indicates otherwise. Additionally, unless otherwise indicated, the terms "first," "second," etc. are used herein merely as labels, and are not intended to impose ordinal, positional, or hierarchical requirements on the items to which these terms refer. Moreover, reference to, for example, a "second" item does not require or preclude the existence of, for example, a "first" or lower-numbered item or a "third" or higher-numbered item.

The systems and methods described herein relate to a protective sleeve for a component of a gas turbine engine. Specifically, in an exemplary embodiment, the protective sleeve is for a probe portion of a thermocouple. In the exemplary embodiment, the protective sleeve includes a first portion and a second portion configured to mate together. The first portion includes a first inner surface, a first outer surface, a first body extending between the first inner surface and the first outer surface, at least one first slot defined within the first portion, and a first-portion projection extending axially along the first portion. The second portion includes a second inner surface, a second outer surface, a second body extending between the second inner surface and the second outer surface, at least one second slot defined within the second portion, and a second-portion receiving channel extending axially along the second portion. The at least one first slot and at least one second slot include a filler material to facilitate sealing against gases from the hot flow path traversing along the inner surfaces of the sleeve. The first portion and the second portion are configured to couple together around the probe by mating the first-portion projection with the second-portion receiving channel, such as in an interference fit. For example, when the portions are mated, pairs of the first and second slots register with each other such that the sealing filler material in each registered pair of slots extends around an entire circumference of the inner surface of the sleeve. In an embodiment, the protective sleeve provides protection for the probe against damage caused by fretting or other physical contact with other components within the gas turbine. In further or alternative embodiments, the protective sleeve provides protection from thermal damage by radially sealing the probe from high temperature fluids. In some such embodiments, the protective sleeve described herein helps prevent damage to the component of the gas turbine, such as the probe, thereby lowering cost associated with replacing the component, which can include downtime for the turbine engine.

FIG. 1 is a schematic view of an exemplary rotary machine 100, i.e., a turbomachine, and more specifically a turbine engine. In the exemplary embodiment, rotary machine 100 is a gas turbine engine. Alternatively, rotary machine may be any other turbine engine and/or rotary machine, including, without limitation, a steam turbine engine, a gas turbofan aircraft engine, other aircraft engine, a wind turbine, a compressor, and a pump. In the exemplary embodiment, turbine engine 100 includes an intake section 102, a compressor section 104 that is coupled downstream from intake section 102, a combustor section 106 that is coupled downstream from compressor section 104, a turbine section 108 that is coupled downstream from combustor section 106, and an exhaust section 110 that is coupled downstream from turbine section 108. Turbine section 108 is coupled to compressor section 104 via a rotor shaft 112. It should be noted that, as used herein, the term "couple" is not limited to a direct mechanical, thermal, electrical, and/or flow communication connection between components, but may also include an indirect mechanical, thermal, electrical, and/or flow communication connection between multiple components. In the exemplary embodiment, combustor section 106 includes a plurality of combustors 114. Combustor section 106 is coupled to compressor section 104 such that each combustor 114 is in flow communication with the compressor section 104. Rotor shaft 112 is further coupled to a load 116 such as, but not limited to, an electrical generator and/or a mechanical drive application. In the exemplary embodiment, each of compressor section 104 and turbine section 108 includes at least one rotor assembly 118 that is coupled to rotor shaft 112. Each rotor assembly 118 of turbine section 108 includes a plurality of circumferentially arranged, radially extending turbine blades 119.

In operation, intake section 102 channels air 120 towards compressor section 104. Compressor section 104 compresses inlet air 120 to higher pressures prior to discharging compressed air 122 towards combustor section 106. Compressed air 122 is channeled to combustor section 106 where it is mixed with fuel (not shown) and burned to generate high temperature combustion gases 124. Combustion gases 124 are channeled downstream towards turbine section 108 and impinge upon turbine blades 119, converting thermal energy to mechanical rotational energy that is used to drive rotor assembly 118 about a longitudinal axis 126. Often, combustor section 106 and turbine section 108 are referred to as a hot gas section 109 of turbine engine 100. Exhaust gases 128 then discharge through exhaust section 110 to ambient atmosphere.

In some embodiments, a temperature measurement device 150 extends through casing 152 of turbine section 108 into turbine section 108. Temperature measurement device 150 is operatively coupled to a controller 205 configured to monitor the output signals from temperature measurement device 150. More specifically, temperature measurement device 150 is positioned within turbine section 108 such that it can detect temperature within the hot gas section 109. Temperature measurement device 150 and other components, such as turbine blades 119, within hot flow path 109 can be exposed to temperatures as high as 2200 degrees Fahrenheit in some embodiments, creating heat stresses. Further, because of the high velocity of fluid within hot flow section 109, temperature measurement device 150 and other components, such as turbine blades 119, within hot flow section 109 can be exposed to vibrational and contact stresses due to interaction with other components of gas turbine engine 100.

Figure 2:
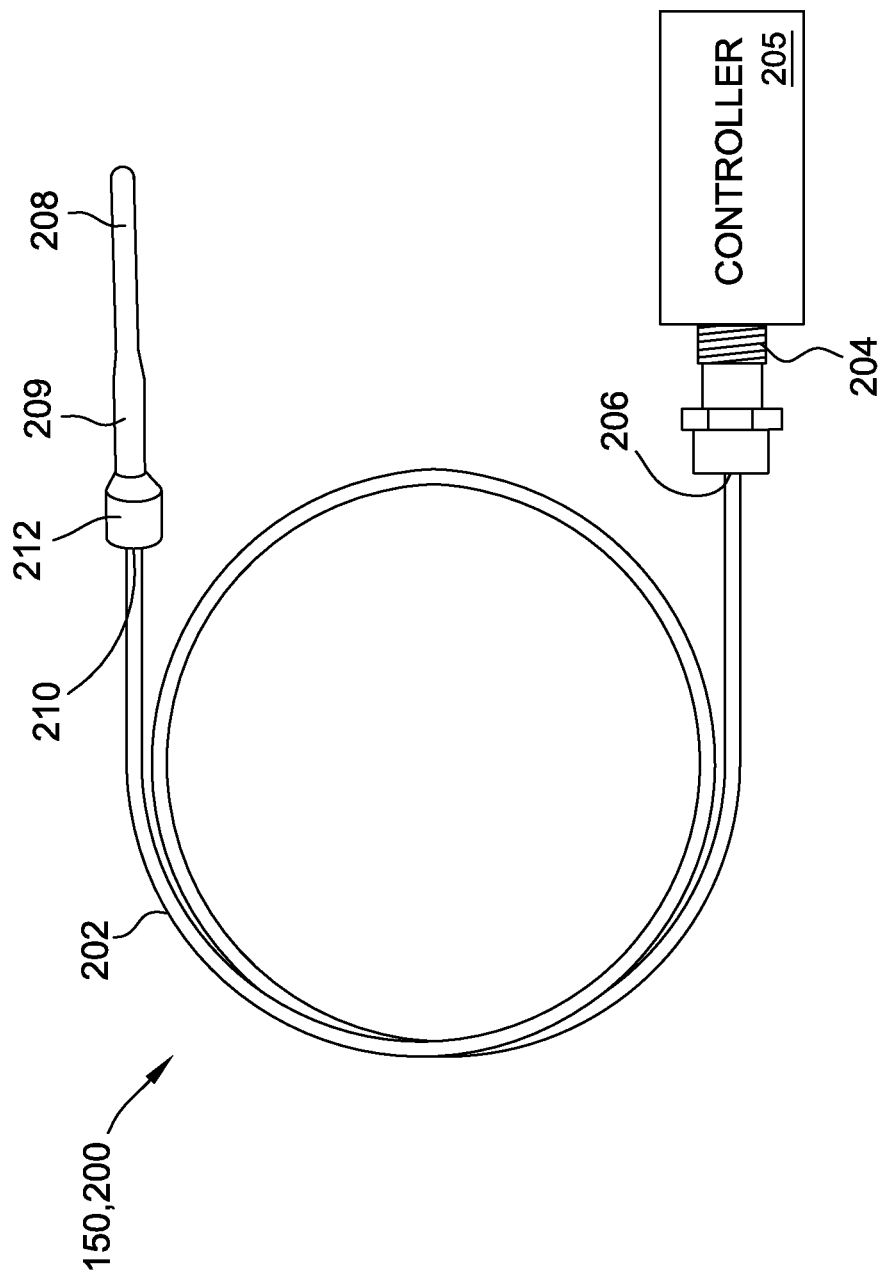
FIG. 2 is a perspective view of a temperature sensing device that may be used with the turbine engine assembly shown in FIG. 1.

FIG. 2 is a schematic view of an exemplary embodiment of temperature measurement device 150. In the exemplary embodiment, temperature measurement device 150 is a thermocouple 200. In alternative embodiments, temperature measurement device 150 is any device that allows for the measurement of thermal changes. In the exemplary embodiment, temperature measurement device 150 includes a wire-encasing element 202 having a controller connector 204 at a first end 206 and a probe 208 connected at second end 210 via a connection element 212. Controller connector 204 connects to controller 205 configured to receive temperature measurements from temperature measurement device 150. Connection element 212 provides an interface between probe 208 and wire-encasing element 202. Probe 208 further includes a protective covering 209 which, in some embodiments, may also cover other portions of temperature measurement device 150, such as wire-encasing element 202 and connection element 212. In some embodiments, protective covering 209 is a polymer sleeve or coating that can withstand high temperatures of a gas turbine. In the exemplary embodiment in which temperature measurement device 150 is thermocouple 200, two wires (not shown) made from dissimilar metals join at a junction within probe 208 and the junction produces an electrical potential that measures temperature of the medium to which probe 208 is exposed. The temperature measurement is transmitted from probe 208 through wire-encasing element 202 to controller connector 204 and to controller 205.

In the exemplary embodiment, probe 208 and portions of connection element 212 extend into turbine section 108 from turbine casing 152 and wire-encasing element 202 and controller connector 204 extend within casing 152 and outside of turbine section 108 to controller 154. As such, probe 208 and portions of connection element 212 are exposed to high temperatures and high-velocity fluid within hot gas section 109. The high temperatures and high-velocity fluid can cause damage to the probe 208 and/or connection element 212. Specifically, in some embodiments, the high temperature/high velocity fluid can cause probe 208 to fret against other components within gas turbine 100. In some such embodiments, repetitive fretting in the high temperatures can lead to damage of protective covering 209, exposing probe 208 to the environment in hot flow section 109 (shown in FIG. 1) and/or additional fretting of probe 208 itself. In some such embodiments, these conditions can lead to inaccurate readings from probe 208.

Figure 3:
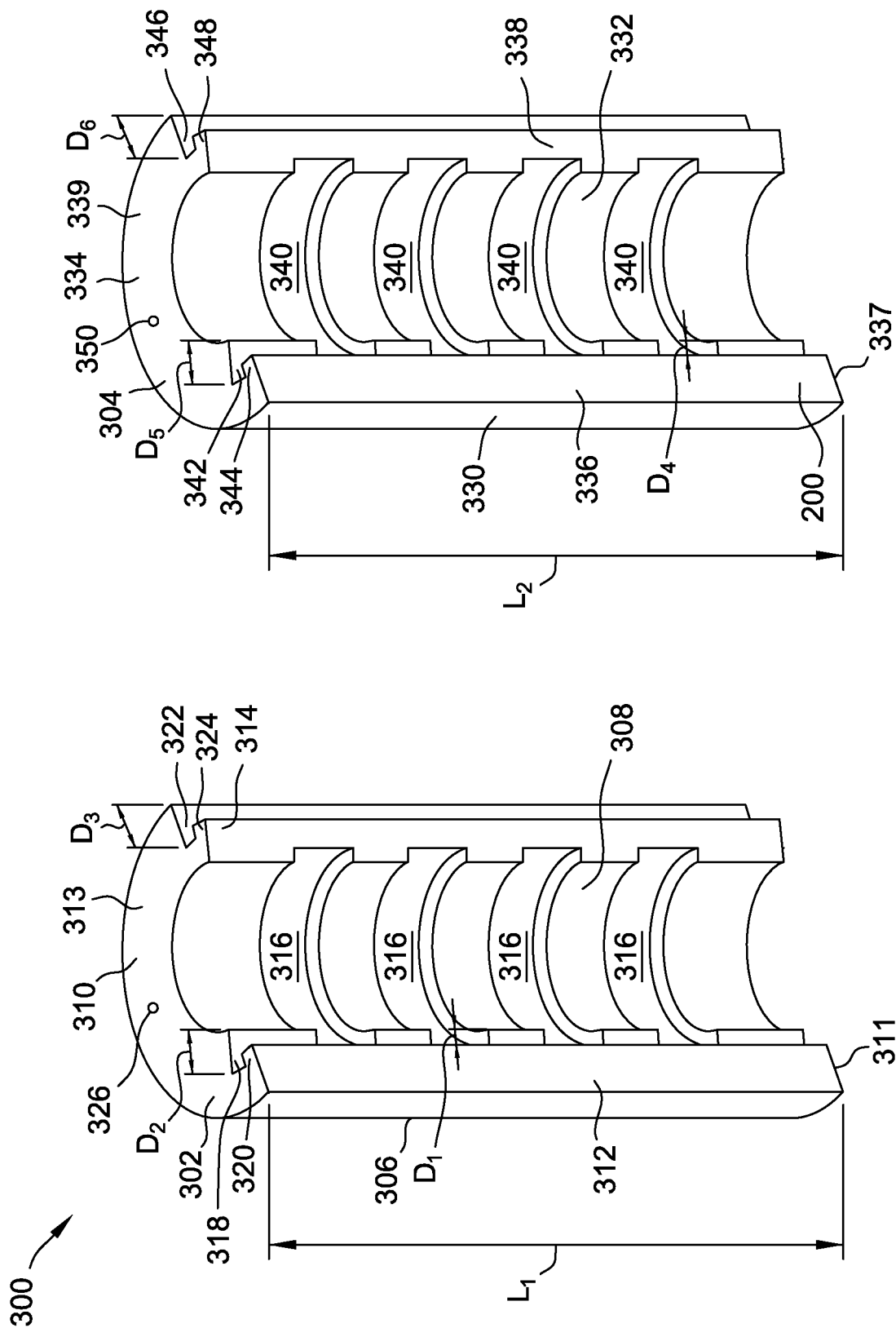
FIG. 3 is a perspective view of first and second portions of a protective sleeve that may be used with the temperature sensing device shown in FIG. 2.

FIG. 3 is a schematically view of an exemplary sleeve 300 for use with temperature measurement device 150. In alternative embodiments, sleeve 300 may be used with other components of turbine 100, such as, for example, other environment-sensing and operation-detection devices, such as a pressure sensor. Sleeve 300 includes a first portion 302 and a second portion 304. In the exemplary embodiment, first portion 302 has substantially the same configuration as second portion 304, such that first portion 302 and second portion 304 are interchangeable. In some embodiments, the substantially identical shapes of first portion 302 and second portion 304 facilitate a decreased cost and ease of installation of sleeve 300. Alternatively, first portion 302 and second portion 304 have other shapes and configurations than substantially identical shapes and configurations.

More specifically, in the exemplary embodiment, first portion 302 and second portion 304 each have substantially arcuate profiles, extending in a substantially a half-cylindrical shape. Accordingly, because of the cylindrical profiles, directional components for sleeve 300, first portion 302, and second portion 304 are referred to with reference to axial, circumferential, and radial directions. However, the terms "axial, circumferential, and radial" are used for convenience of description only, and are not to be construed to limit sleeve 300 to arcuate or cylindrical profiles, as alternative configurations and shapes that allow sleeve 300 and portions 302, 304 to function as described herein are contemplated within the scope of this disclosure. For example, first portion 302 and second portion 304 may define semi-rectangular profiles that cooperate to form a square or rectangular profile of sleeve 300.

In the exemplary embodiment, first portion 302 has a first outer surface 306, a first inner surface 308, and a first body 310 defined and extending radially therebetween. First portion 302 also extends circumferentially between a first end 312 and a second end 314 and extends axially from a first base surface 311 to a first upper surface 313 over a first axial length L1. First inner surface 308 includes a plurality of first radial slots 316 recessed radially outward to a first depth D1 from first inner surface 308. In an embodiment, first portion 302 adjacent to first end 312 also includes a first receiving channel 318 depending radially inward from first inner surface 308 to a second depth D2. First receiving channel 318 defines one side of a first projection 320 that projects radially inward along first end 312. In an embodiment, first portion 302 adjacent to second end 314 further includes a second receiving channel 322 depending radially inward from first outer surface 306 to a third depth D3. Second receiving channel 322 defines one side of a second projection 324 that projects radially outward along second end 314.

In the exemplary embodiment, a first body channel 326 extends through at least a portion of first body 310. In some embodiments, first body channel 326 extends substantially axially through first body 310 (i.e. first body channel 326 has an axial length greater than the radial or circumferential lengths). In some such embodiments, first body channel 326 is situated substantially midway between first outer surface 306 and first inner surface 308 and substantially midway between first end 312 and second end 314. In alternative embodiments, first body channel 326 is located anywhere in first body 310 that allows first portion 302 to function as described herein. In additional embodiments, first body channel 326 extends substantially circumferentially through first body 310 at points between first end 312 and second end 314 (i.e. first body channel 326 has a circumferential length greater than the axial or radial lengths). In other embodiments, first body channel 326 extends substantially radially through first body 310 at points between first outer surface 306 and first inner surface 308 (i.e. first body channel 326 has an radial length greater than the axial or circumferential lengths). In still further embodiments, first body channel 326 may have other shapes and orientations in the axial, radial and circumferential dimensions through first body 310 that allows first body channel 326 to function as described herein, such as, for example, a spiral configuration.

In the exemplary embodiment, first receiving channel 318, first projection 320, second receiving channel 322, second projection 324, and first body channel 326 extend over an entirety of the axial length L1 of first portion 302. In alternative embodiments, each of first receiving channel 318, first projection 320, second receiving channel 322, second projection 324, and first body channel 326 extend over any suitable length of first portion 302 less than axial length L1.

In the exemplary embodiment, second portion 304 has a second outer surface 330, a second inner surface 332, and a second body 334 defined and extending radially therebetween. First portion 302 also extends circumferentially between a third end 336 and a fourth end 338 and extends axially from a second base surface 337 to a second upper surface 339 over a second axial length L2. Second inner surface 332 includes a plurality of second radial slots 340 recessed radially outward to a fourth depth D4 from second inner surface 332. In an embodiment, second portion 304 adjacent to third end 336 also includes a third receiving channel 342 depending radially inward from second inner surface 332 to a fifth depth D5. Third receiving channel 342 defines one side of a third projection 344 that projects radially inward along third end 336. In an embodiment, second portion 304 adjacent to fourth end 338 further includes a fourth receiving channel 346 depending radially inward from second outer surface 330 to a sixth depth D6. Fourth receiving channel 346 defines one side of a fourth projection 348 that projects radially outward along fourth end 338.

In the exemplary embodiment, a second body channel 350 extends through at least a portion of second body 334. In some embodiments, second body channel 350 extends substantially axially through second body 334. In some such embodiments, second body channel 350 is situated substantially midway between second outer surface 330 and second inner surface 332 and substantially midway between third end 336 and fourth end 338. In alternative embodiments, second body channel 350 is located anywhere in second body 334 that allows second portion 304 to function as described herein. In additional embodiments, second body channel 350 extends substantially circumferentially through second body 334 at points between third end 336 and fourth end 338. In other embodiments, second body channel 350 extends substantially radially through second body 334 at points between second outer surface 330 and second inner surface 332. In still further embodiments, second body channel 350 may have other shapes and orientations in the axial, radial and circumferential dimensions through second body 334 that allows second body channel 350 to function as described herein, such as, for example, a spiral configuration.

In the exemplary embodiment, third receiving channel 342, third projection 344, fourth receiving channel 346, fourth projection 348, and second body channel 350 each extend over an entirety of second axial length L2 of second portion 304. In alternative embodiments, each of third receiving channel 342, third projection 344, fourth receiving channel 346, fourth projection 348, and second body channel 350 extend over any suitable length of second portion 304 less than second axial length L2.

In the exemplary embodiment, first axial length L1 and second axial length L2 are substantially the same. In alternative embodiments, axial lengths L1, L2 may be different lengths. In some embodiments, axial lengths L1, L2 are greater than or equal to about 0.25 inches and less than or equal to about 2.5 inches. In further embodiments, axial lengths L1, L2 are greater than or equal to about 0.75 inches and less than or equal to about 1.25 inches. In still further embodiments, axial lengths L1, L2 are about 1.0 inch. In alternative embodiments, axial lengths L1, L2 are any lengths that allow sleeve 300 to function as described herein.

Figure 4:
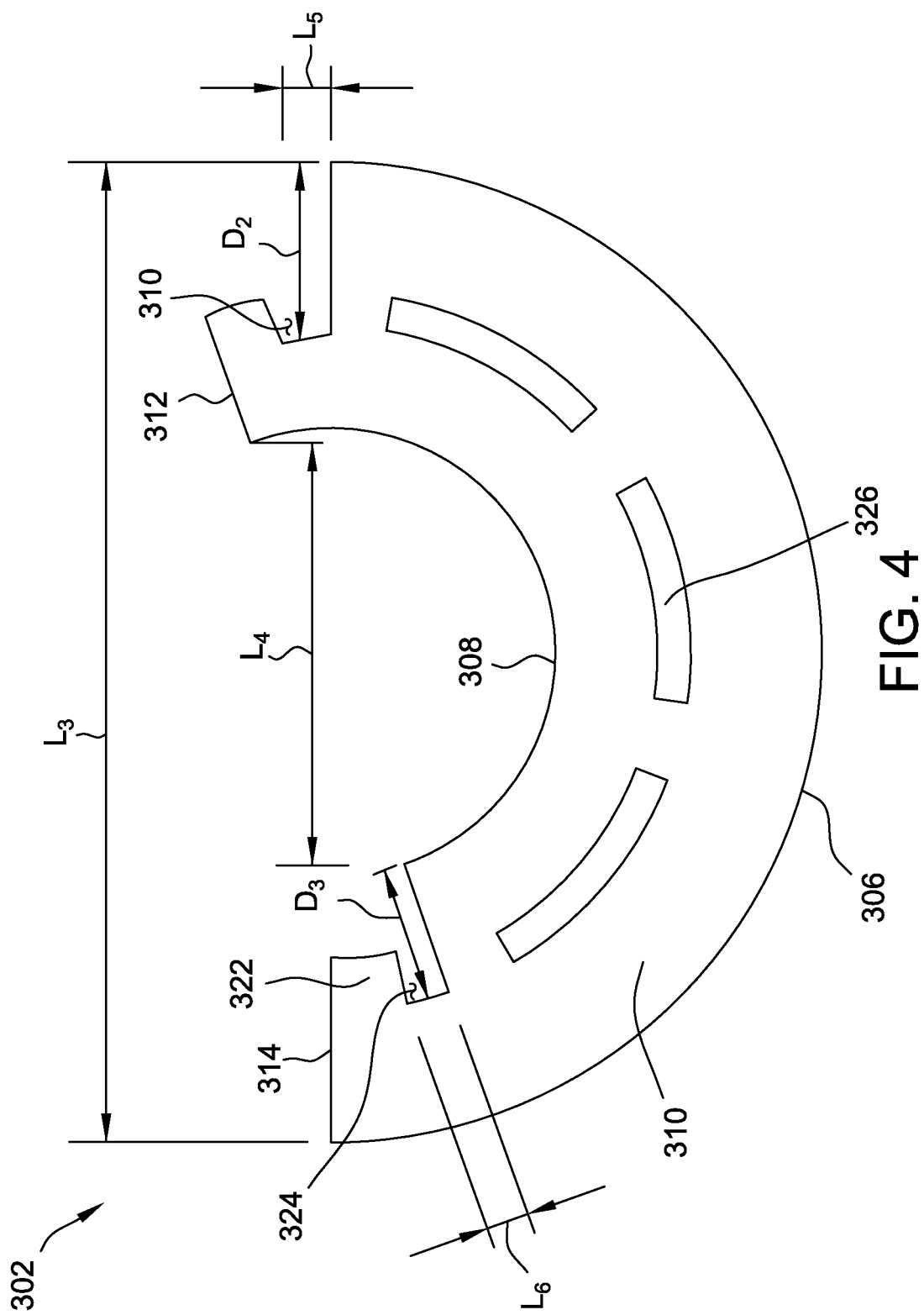
FIG. 4 is a top view of a portion of the protective sleeve shown in FIG. 3.

FIG. 4 is a top view of first portion 302 of sleeve 300. In the exemplary embodiment, second portion 304 has substantially the same configuration as first portion 302 and, as such, descriptions of first portion 302 with reference to FIG. 3 also apply to second portion 304. In the exemplary embodiment, first portion 302 has an outer diameter length L3, corresponding to the diameter of two points on first outer surface 306, one point at first end 312 and one point at second end 314. In an embodiment, outer diameter length L3 is greater than or equal to about 100 mil and less than or equal to about 500 mil. In further embodiments, outer diameter length L3 is greater than or equal to about 200 mil and less than or equal to about 400 mil.

In the exemplary embodiment, first portion 302 has also an inner diameter length L4 corresponding the diameter of across two points on first inner surface 308, one point at first end 312 and one point at second end 314. In an embodiment, inner diameter length L4 is greater than or equal to about 25 mil and less than or equal to about 350 mil. In further embodiments, inner diameter length L4 is greater than or equal to about 50 mil and less than or equal to about 250 mil. In alternative embodiments, diameters L3, L4 are any lengths that allow sleeve 300 to function as described herein.

As shown in FIG. 4, first receiving channel 318 has a first channel width L5 transverse to second distance D2. Second receiving channel 324 has a second channel width L6 transverse to third distance D3. In an embodiment, channel widths L5, L6 are greater than or equal to about 5 mil and less than or equal to about 20 mil. In further embodiment, channel widths L5, L6 are greater than or equal to about 9 mil and less than or equal to about 15 mil. In still further embodiments, channel widths L5, L6 are about 12 mil. In alternative embodiments, channel widths L5, L6 are any lengths that allow sleeve 300 to function as described herein.

Figure 5:
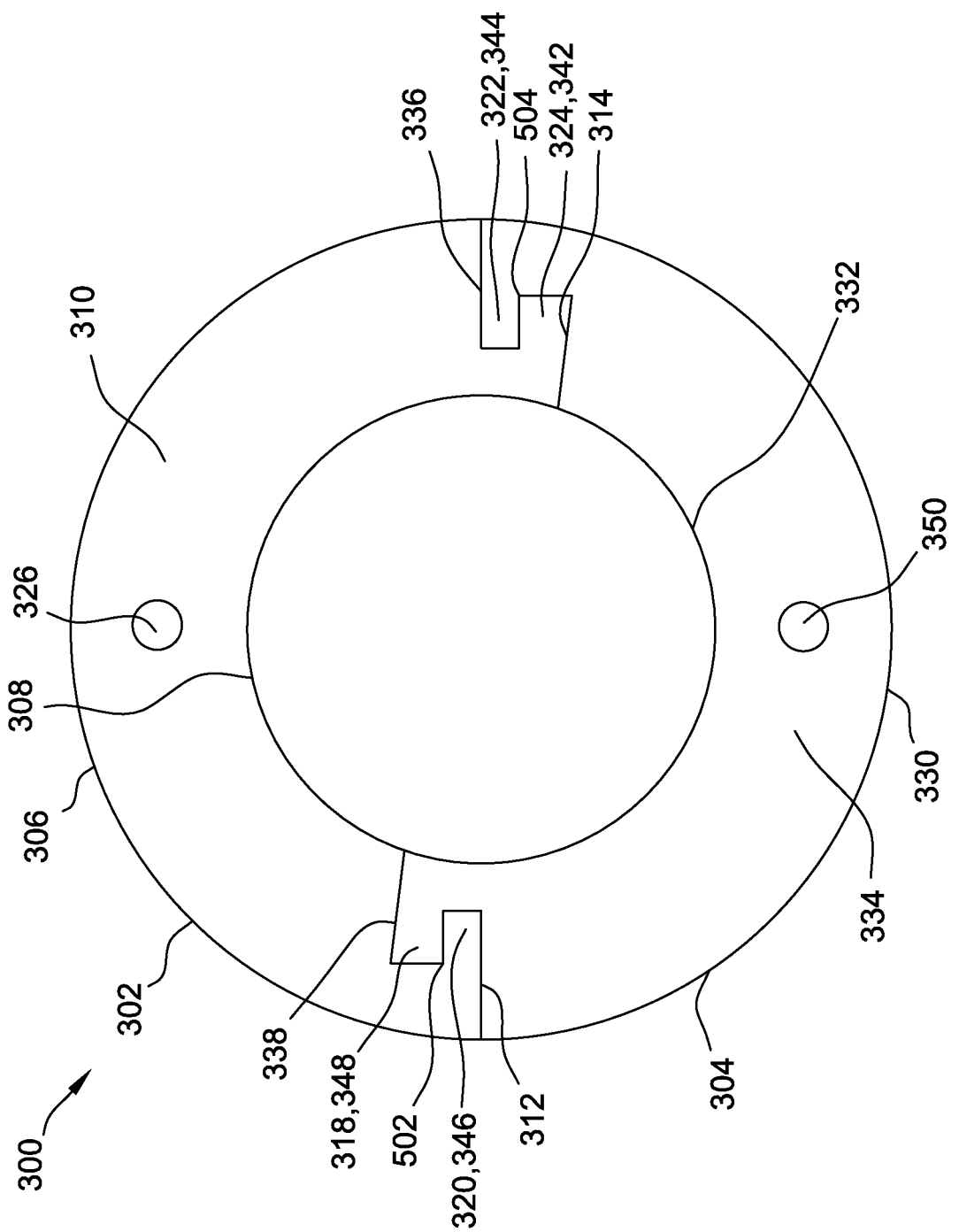
FIG. 5 is a top view of a first portion and a second portion of the protective sleeve shown in FIG. 3 mated together.

FIG. 5 is a top view of first portion 302 mated with second portion 304 forming sleeve 300. In the exemplary embodiment, when first portion 302 and second portion 304 are mated, their respective inner surfaces 308, 332 cooperate to define a cylindrical inner wall of sleeve 300 and respective outer surfaces 306, 330 cooperate to define a cylindrical outer wall of sleeve 300. Alternatively, inner surfaces 308, 332 and/or outer surfaces 306, 330 are arranged in any suitable fashion that enables sleeve 300 to function as described herein.

In the exemplary embodiment, in which first portion 302 and second portion 304 are substantially identical in shape and configuration, second portion 304 is inverted relative to first portion 302 to enable mating with first portion 302. More specifically, first projection 320 of first portion 302 is received within fourth receiving channel 346 of second portion 304, and fourth projection 348 of second portion 304 is received within first receiving channel 318 of first portion 302, for example in an interference fit, creating a first seal 502 between first portion 302 and second portion 304. Additionally in the exemplary embodiment, second projection 324 of first portion 302 is received within third receiving channel 342 of second portion 304, and third projection 344 of second portion 304 is received within second receiving channel 322 of first portion 302, for example in an interference fit, creating second seal 504 between first portion 302 and second portion 304. First seal 502 and second seal 504 between first portion 302 and second portion 304 form sleeve 300 that is radially sealed from the outside environment.

In the exemplary embodiment, first portion 302 and second portion 304 slidably mate with each other in the axial direction. More specifically, in some such embodiments and by way of example, first projection 220 at first upper surface 313 is registered with fourth receiving channel 346 at second base surface 337, and fourth receiving channel 346 is slid axially along first projection 320 until first base surface 311 and second base surface 337 (shown in FIG. 3) are axially aligned, such that first end 312 is coupled in face-to-face relationship with fourth end 338 and second end 314 is coupled in face-to-face relationship with third end 336. The remaining projections 324, 344, 348 and receiving channels 318, 322, 342 similarly slidably engage each other in the configuration described above. In alternative embodiments, first portion 302 and second portion 304 may engage in another manner, such as slidable engagement in the circumferential direction and/or radial direction. In still further embodiments, first portion 302 and second portion 304 may engage in another manner, such as clip or twist together.

It will be appreciated that the description of sleeve 300 with reference to FIGS. 3-5 is by means of illustration and that other embodiments of sleeve 300 are contemplated within the scope of this disclosure. For example, in some embodiments, sleeve 300 includes more portions than just first portion 302 and second portion 304 that interface along respective circumferential ends and join together to form sleeve 300. In alternative embodiments, first portion 302 and second portion 304 are at least partially formed as a single, integral piece. In additional embodiments, first portion 302 and second portion 304 may have more or fewer receiving channels and/or projections. For example, first portion 302 may have a single receiving channel (i.e. first receiving channel 318) and projection (i.e. first projection 320) and second portion 304 may also have a single receiving channel (i.e. fourth receiving channel 346) and projection (i.e. fourth projection 348). In some such embodiments, a single seal (i.e. first seal 502) may be formed between first portions 302 and second portion 304.

Figure 6:
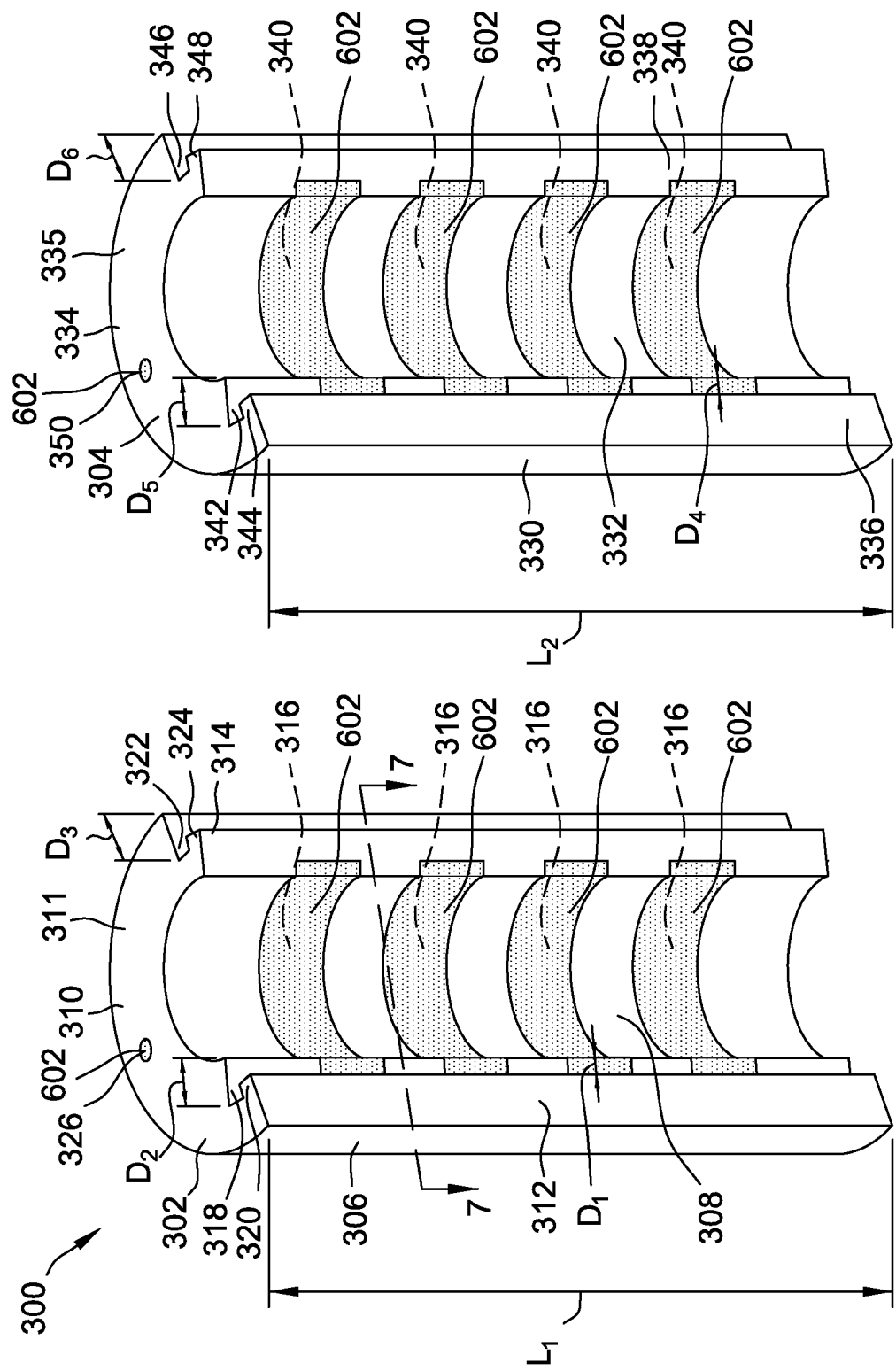
FIG. 6 is a perspective view of the first and second portions of the protective sleeve shown in FIG. 3 including a filler material.

FIG. 6 is a schematic view of sleeve 300 having portions filled with a filler material 602. In the exemplary embodiment of sleeve 300, filler material 602 fills at least a portion of at least one of first radial slots 316 and at least a portion of at least one of second radial slots 340. In further embodiments, filler material 602 fills each slot 316, 340 of first portion 302 and second portion 304 to at least first depth D1 and fourth depth D4. In the exemplary embodiment, slots 316 and 340 are arranged such that, when portions 302, 304 are mated, pairs of first slots 316 and second slots 340 register with each other such that filler material 602 extends around an entire circumference of inner surface 308, 332 of sleeve 300 in each registered pair of slots 316, 340. Alternatively, slots 316 and 340 are arranged in any suitable fashion that enables sleeve 300 to function as described herein.

In the exemplary embodiment, filler material 602 is a ceramic, polymer, and/or metal-based material. In further embodiments, filler material 602 is a silica-based material. In further or alternative embodiments, filler material 602 is any material capable of capable of sustaining heat equal to or greater than 1100 degree Fahrenheit without melting. In further embodiments, filler material 602 is any material capable of capable of sustaining heat equal to or greater than 1400 degree Fahrenheit without melting. In alternative embodiments, filler material 602 is any material that allows sleeve 300 to function as described herein.

In the exemplary embodiment, first portion 302 and second portion 304 are fabricated from a metallic material. In some such embodiments, portions 302, 304 are iron, zinc, cobalt, and/or nickel based. In some such embodiments, portions 302, 304 include a zinc-base, cobalt-base, and/or nickel-base superalloy. In alternative or further embodiments, portions 302, 304 include steel. In alternative embodiments, portions 302, 304 are fabricated from any material that is corrosion resistant and that is capable of sustaining heat equal to or greater than 1100 degree Fahrenheit without melting and/or that allows sleeve 300 to function as described herein. In still further embodiments, portions 302, 304 are fabricated from any material that is corrosion resistant and that is capable of sustaining heat equal to or greater than 1400 degree Fahrenheit without melting and/or that allows sleeve 300 to function as described herein. In some embodiments, first portion 302 and second portion 304 are fabricated using an additive manufacturing process, such as direct metal laser melting. In other embodiments, first portion 302 and second portion 304 are fabricated using any method that allows for the formation of sleeve 300 as described herein.

In the exemplary embodiment, first portion 302 and second portion 304 provide structural integrity to sleeve 300. When coupled to a portion of gas turbine 100, such as a probe 208 of temperature measurement device 150, sleeve 300 helps prevent fretting of probe 208 that can damage probe 208. In some embodiments, filler material 602 within sleeve 300 provides thermal insulation for first portion 302, second portion 304, and/or probe 208 when sleeve 300 is coupled thereto. In further or additional embodiments, filler material 602 helps seal inner surfaces 308, 332 of sleeve 300 from hot gases migrating axially within sleeve 300 from the external environment, such as the environment in hot flow path section 109. In still further embodiments, filler material 602 provides vibrational dampening for sleeve 300 to further inhibit fretting when positioned within hot flow section 109.

Figure 7:
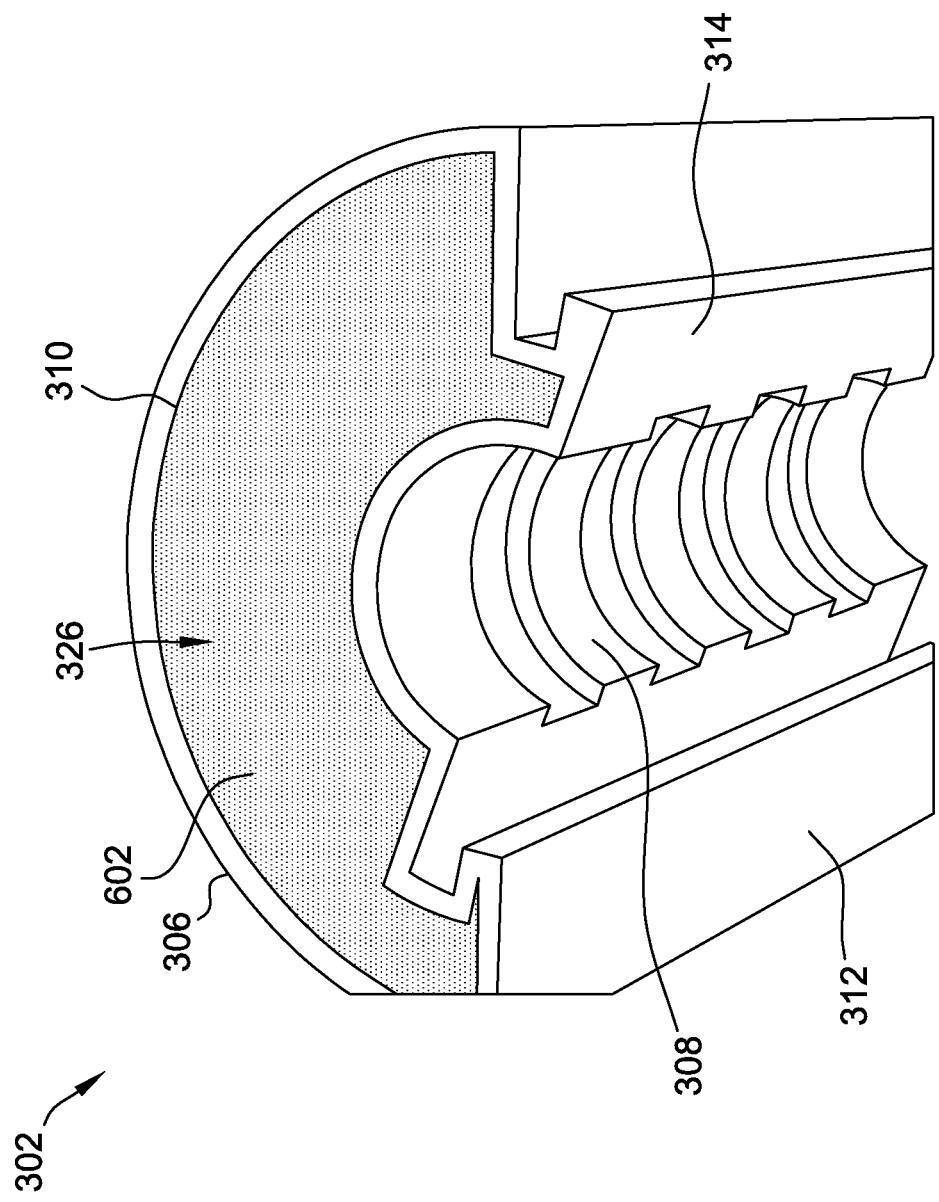
FIG. 7 is a cross-sectional, perspective view of a portion of the protective sleeve shown in FIG. 6 taken along line 7-7.

FIG. 7 is a cross-sectional perspective view of first portion 302 taken along line 7-7. In the exemplary embodiment, axially below first upper surface 313 (shown in FIG. 3), first portion 302 is substantially hollow. More specifically, in an embodiment, first body channel 326 expands circumferentially to occupy substantially all of first body 310 between first outer surface 306 and first inner surface 308 and between first end 312 and second end 314. In some such embodiments, at least a portion of first body channel 326 is at least partially filled with filler material 602. In further embodiments, substantially all of first body channel 326 is filled with filler material 602. In the exemplary embodiment, after fabrication of first portion 302, first body channel 326 is filled axially downward from first upper surface 313. In alternative embodiments, first body channel 326 may be filled from any other part of first portion 302, such as, for example, first outer surface 306, first inner surface 308, first end 312, and/or second end 314.

Figure 8:
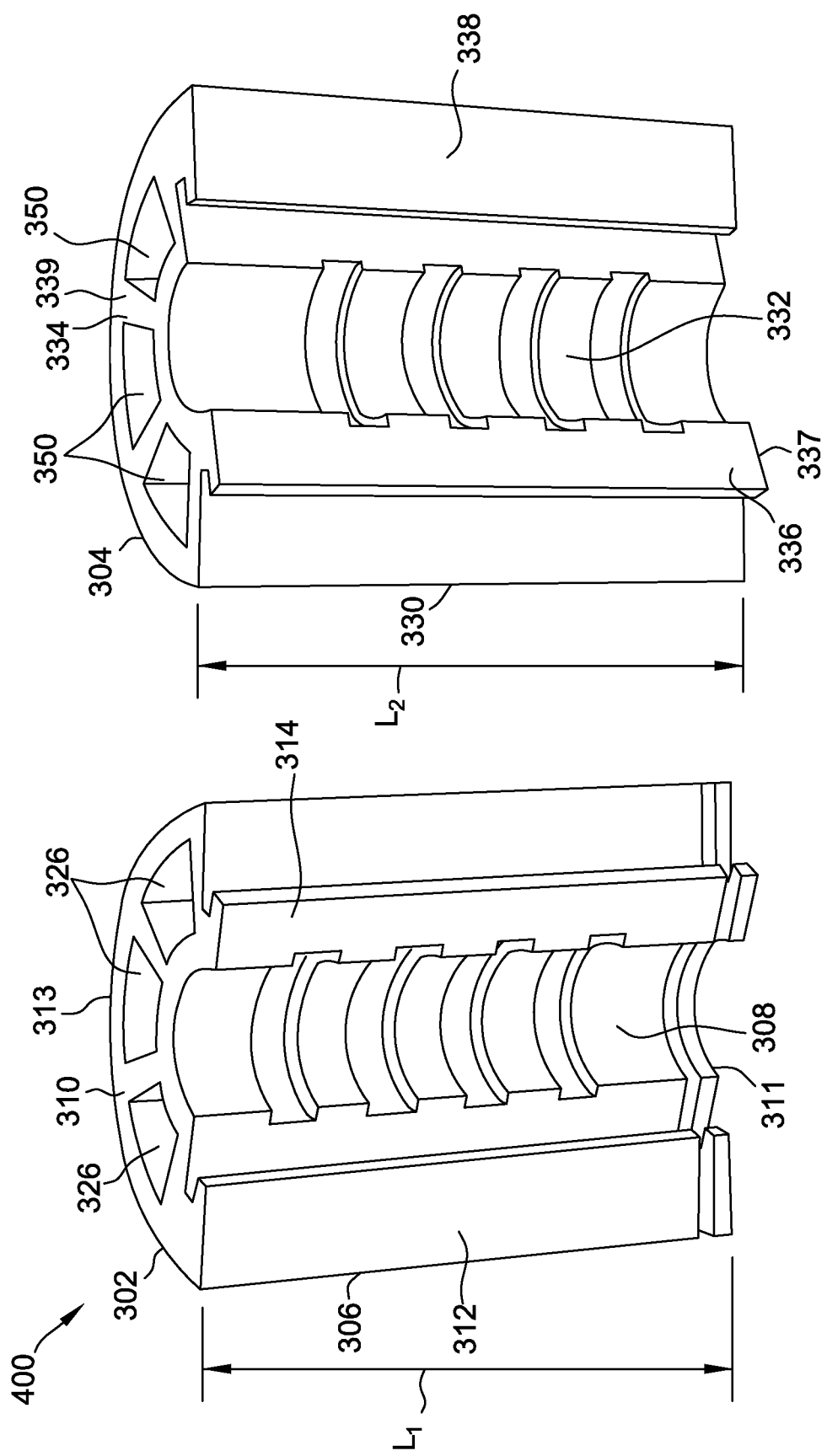
FIG. 8 is a perspective view of first and second portions of an alternative configuration of a protective sleeve that may be used with the temperature sensing device shown in FIG. 2.

FIG. 8 is a perspective view of an alternative embodiment of sleeve 300. In this embodiment, sleeve 300, designated sleeve 400, is substantially identical to sleeve 300, except as described below. In the exemplary embodiment, sleeve 400 includes first portion 302 and second portion 304. In an embodiment, first portion 302 includes a plurality of first body channels 326 extending along first length L1 of first portion 302 from first upper surface 313 to first base surface 311. In some such embodiments, first body channels 326 are substantially consistent in shape and area from first upper surface 313 to first base surface 311. In further or alternative embodiments, first body channels 326 are open at both first upper surface 313 and first base surface 311. More specifically, in the exemplary embodiment, three first body channels 326 are spaced circumferentially from each other within first portion 302. In alternative embodiments, first portion 302 includes more or fewer first body channels 326. In alternative embodiments, first body channels 326 have any shape that allows them to function as described herein. Some such shapes include, but are not limited to, triangles and quadrilaterals, such as trapezoids or *rhombi*. As shown in FIG. 8, in sleeve 400, second portion 304 includes a plurality of second body channels 350 extending from second upper surface 339 to second base surface 337. In the exemplary embodiment, second body channels 350 have configurations the same as, or similar to, first body channels 326. Additionally, in the exemplary embodiment, first body channels 326 and second body channels 350 are configured to receive filler material 602 therein (as shown in FIG. 7).

Figure 9:
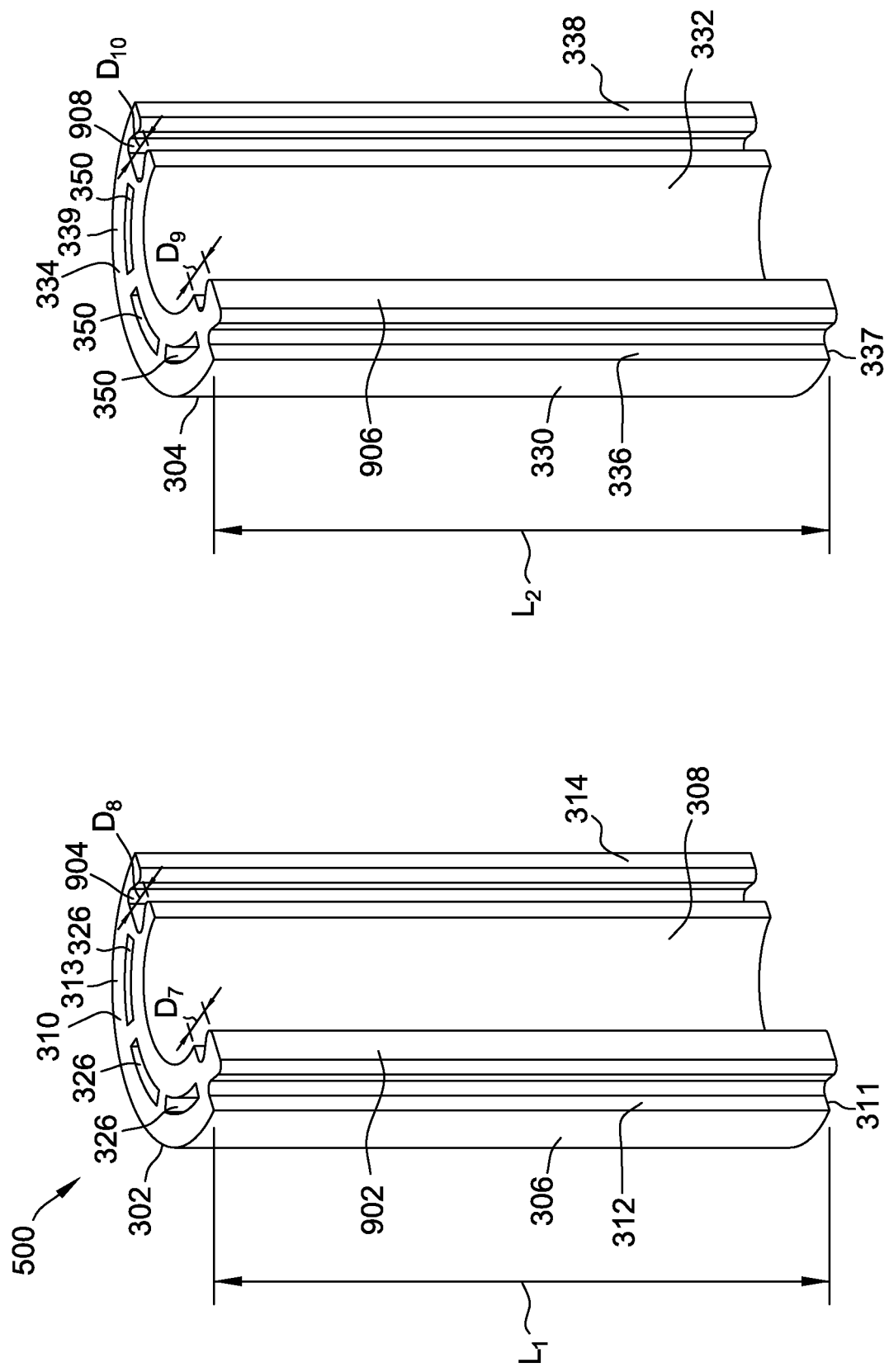
FIG. 9 is a perspective view of first and second portions of another alternative configuration of a protective sleeve that may be used with the temperature sensing device shown in FIG. 2.

FIG. 9 is a perspective view of another alternative embodiment of sleeve 300. In this embodiment, sleeve 300, designated sleeve 500, is substantially identical to sleeves 300 and 400, except as described below. In the exemplary embodiment, with respect to first portion 302, a first projection 902 extends circumferentially from first end 312 a seventh distance D7. Also in the exemplary embodiment, a first receiving channel 904 depends circumferentially from second end 314 into first body 310 to an eighth depth D8. In the exemplary embodiment, second portion 304 includes a second projection 906 extending circumferentially from third end 336 a ninth distance D9. Also in the exemplary embodiment, a second receiving channel 908 depends circumferentially from fourth end 338 into second body 334 to a tenth depth D10. First projection 902 and second receiving channel 908 function substantially as described above with respect to first projection 320 and fourth receiving channel 346, and second projection 906 and first receiving channel 904 function substantially as described above with respect to third projection 344 and second receiving channel 322.

In the exemplary embodiment, first projection 902 and first receiving channel 904 extend the entire axial length L1 of first portion 302. Similarly, in the exemplary embodiment, second projection 906 and second receiving channel 908 extend the entire axial length L2 of second portion 304. In alternative embodiments, first projection 902, first receiving channel 904, second projection 906, and second receiving channel 908 extend any axial length L1, L2 of portions 302, 304 that allows projections 902, 906 and receiving channel 904, 908 to function as described herein. Also in the exemplary embodiment, seventh distance D7 and ninth distance D7 are substantially the same. Similarly, in the exemplary embodiment, eighth distance D8 and D10 are substantially the same. In alternative embodiments, distances D7 and D9 and depths D8 and D10 are any distances that allow first portion 302 and second portion 304 to function as described herein.

Figure 10:
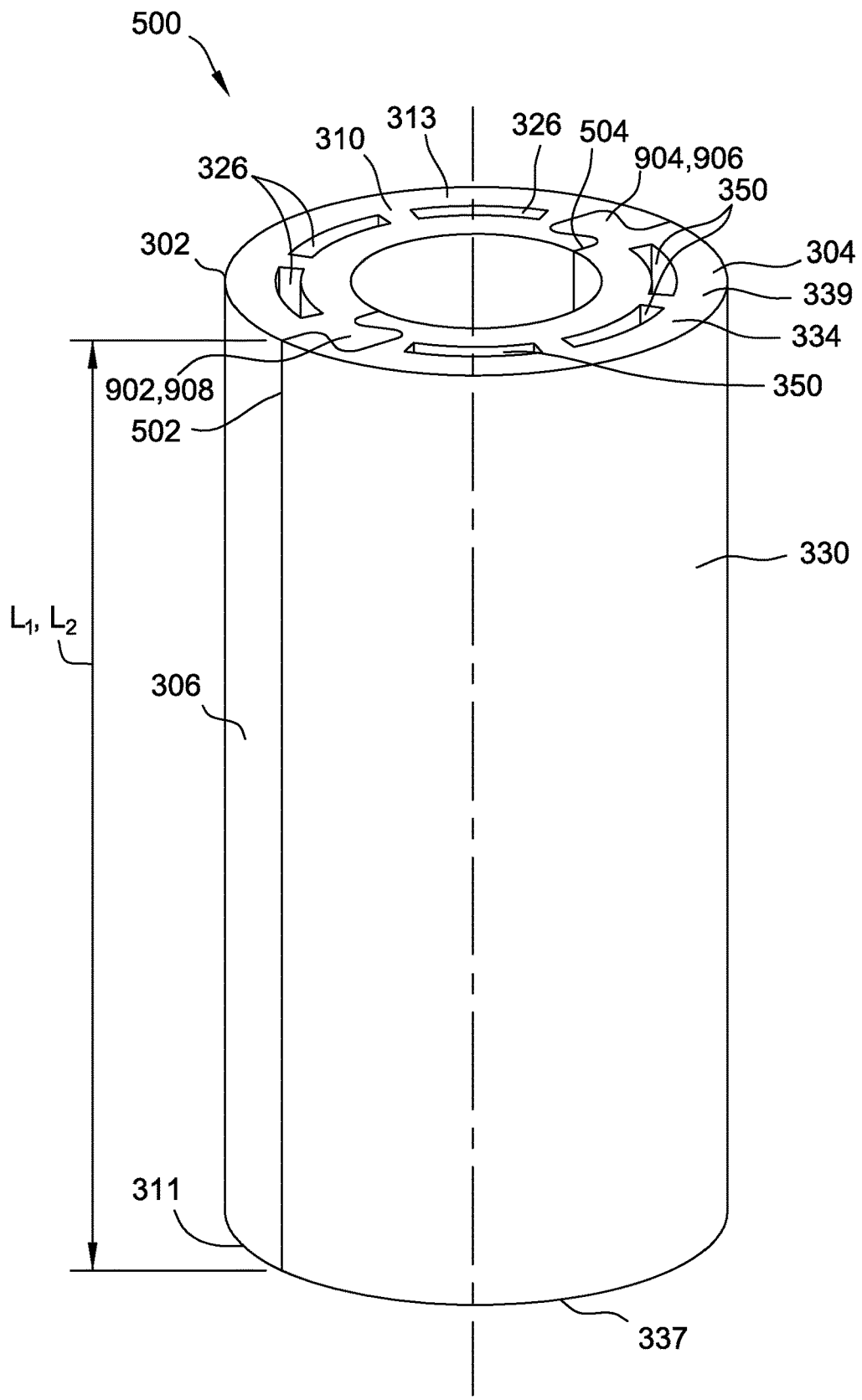
FIG. 10 is a perspective view of the portions of the protective sleeve shown in FIG. 9 mated together.

FIG. 10 is a perspective view of sleeve 500. In the exemplary embodiment, first projection 902 of first portion 302 is received within second receiving channel 908 of second portion 304, for example in an interference fit, creating first seal 502 between first portion 302 and second portion 304. Additionally in the exemplary embodiment, second projection 906 is received within first receiving channel 904, for example in an interference fit, creating second seal 504 between first portion 302 and second portion 304. First seal 502 and second seal 504 between first portion 302 and second portion 304 form sleeve 500 that is radially sealed from the outside environment. In some embodiments, projections 902, 906 and receiving channels 904, 908 have a tapered shape, allowing projections 902, 906 to be circumferentially locked within receiving channels 904, 908, like puzzle pieces. In alternative embodiments, projections 902, 906 and receiving channels 904, 908 have any shape that allows them to function as described herein.

Figure 11:
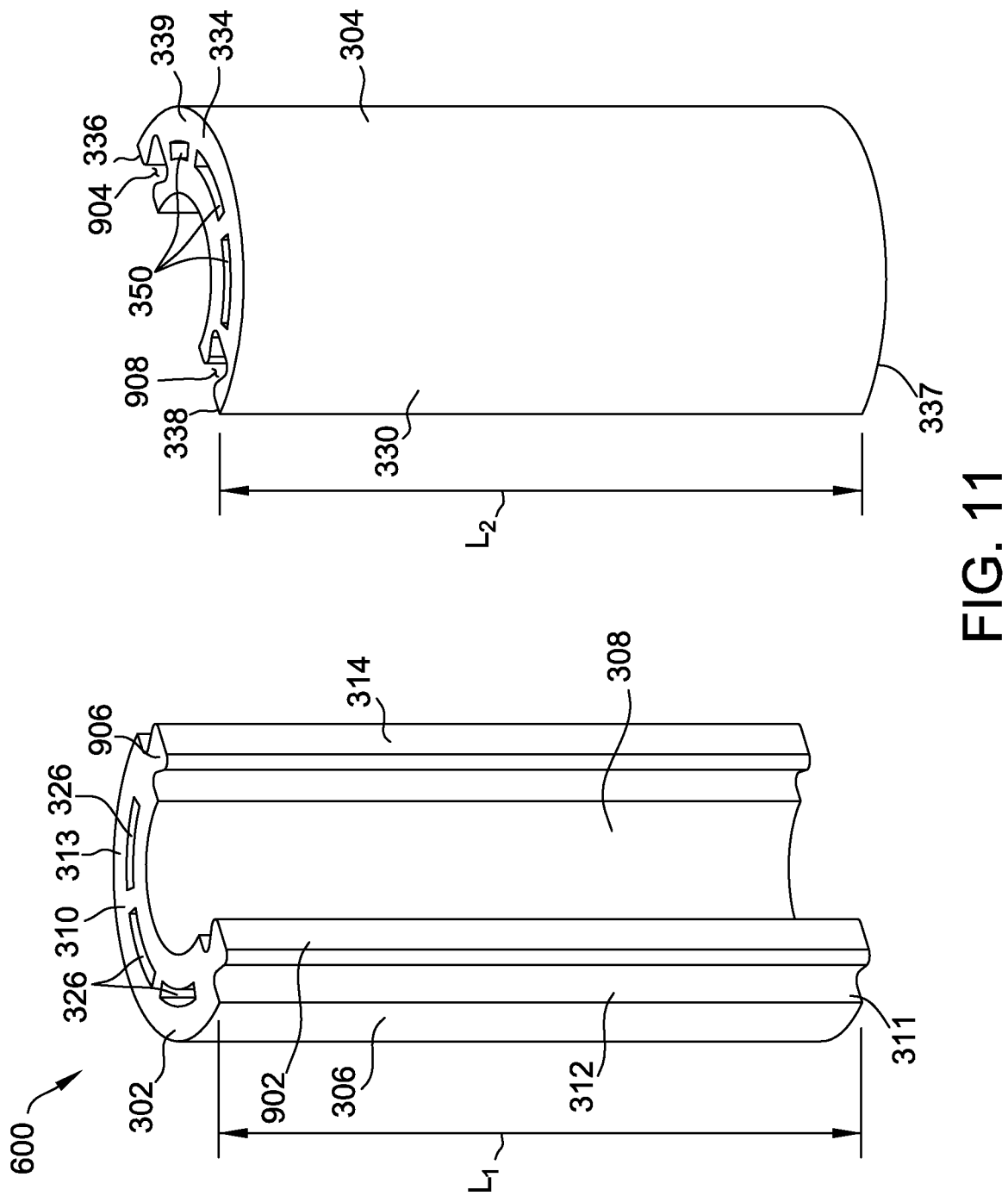
FIG. 11 is a perspective view of another alternative configuration of a protective sleeve that may be used with the temperature sensing device shown in FIG. 2.
Figure 12:
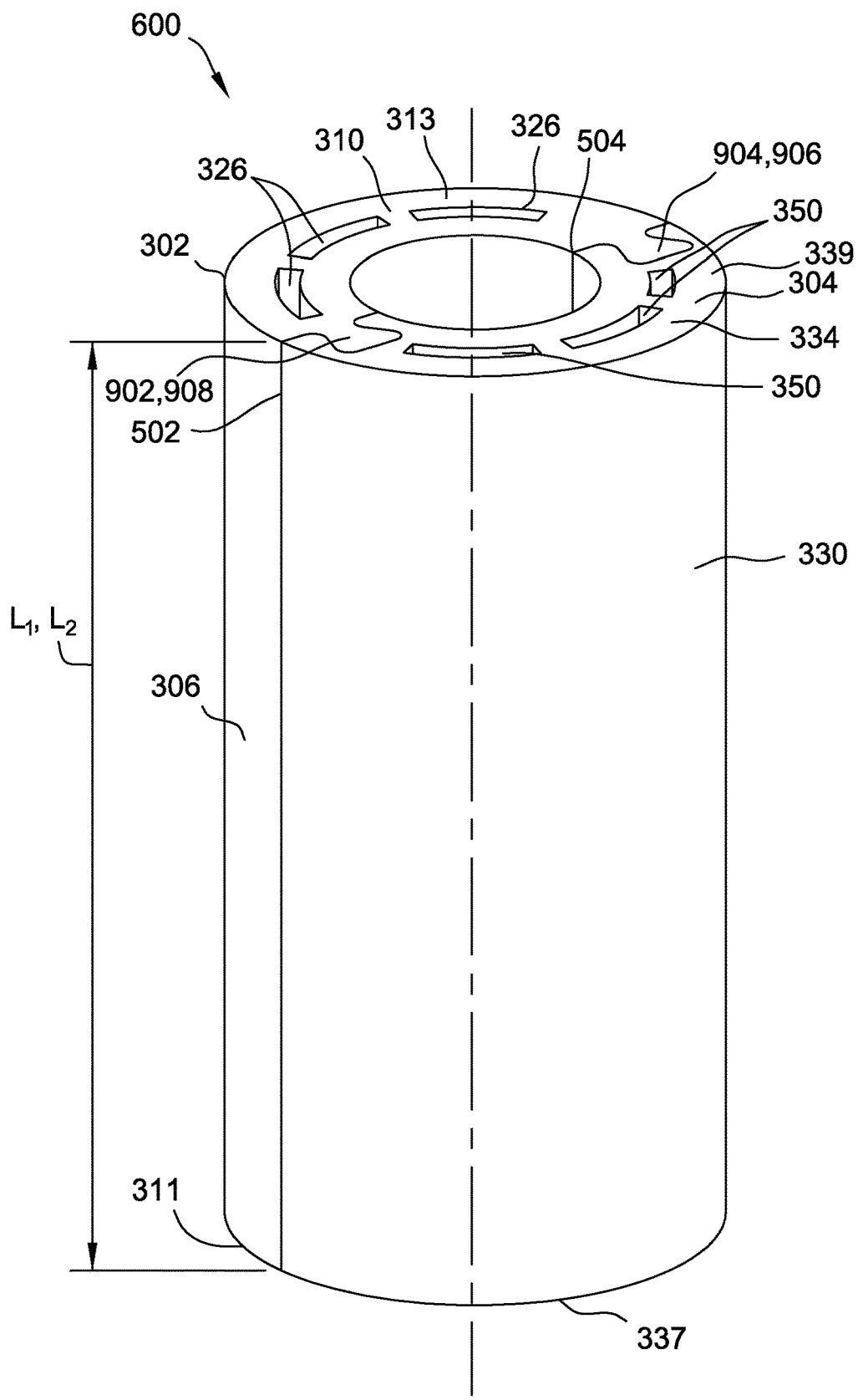
FIG. 12 is a perspective view of the portions of the protective sleeve shown in FIG. 1 mated together.

FIGS. 11 and 12 are perspective views of another alternative embodiment of sleeve 300. In this embodiment, sleeve 300, designated sleeve 600, is substantially identical to sleeve 500, except as described below. In the exemplary embodiment of sleeve 600, first portion 302 includes first projection 902 and second projection 906, and second portion 304 includes a first receiving channel 904 and second receiving channel 908. Similar to sleeve 500, in sleeve 600, first projection 902 is received within second receiving channel 908, creating first seal 502, and second projection 906 is received within first receiving channel 904, creating second seal 504. First seal 502 and second seal 504 between first portion 302 and second portion 304 form sleeve 600 that is radially sealed from the outside environment. In some embodiments, projections 902, 906 and receiving channels 904, 908 are configured substantially similar to configurations described above with reference to FIGS. 9 and 10.

Figure 13:
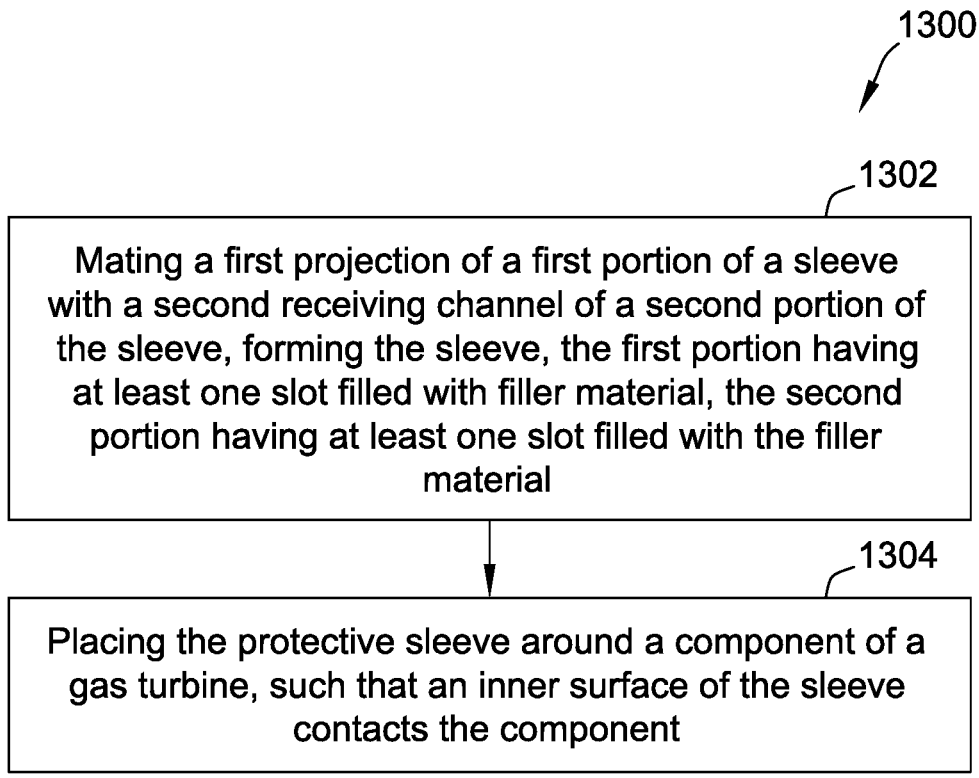
FIG. 13 is a flow diagram of a method of installing a protective sleeve around a component of a gas turbine.

FIG. 13 is a flow diagram of an exemplary method 1300 of installing a protective sleeve around a component of a gas turbine. The method includes mating 1302 a first projection, such as first projection 320, 902, of a first portion, of a first portion, such as first portion 302, of a sleeve, such as sleeves 300, 400, 500, 600, with a second receiving channel, such as fourth receiving channel 346 or second receiving channel 908, of a second portion, such as second portion 304, of the sleeve, forming the protective sleeve. The first portion has at least one slot, such as first radial slot 316, filled with a filler material, such as filler material 602. The second portion has at least one slot, such as second radial slot 340, filled with the filler material. The method further includes placing 1304 the protective sleeve around a component, such as probe 208 of temperature measurement device 150, of a gas turbine, such as gas turbine 100, such that an inner surface, such as first inner surface 308 and second inner surface 332, of the sleeve contacts the component.

The above-described embodiments provide protective coverings for at least some components of located in the hot flow path of gas turbines. Specially, probes of thermocouple located within the hot flow path of a turbine can be subjected to thermal stresses and damage due to the high temperature. Additionally or alternatively, the probes can be damaged by fretting and other physical contact with other components of the turbine due to the high-velocity fluid within the hot flow path. The protective sleeves, when placed around the probes, protect the probes from thermal and physical stresses and damage. In some embodiments, the bodies of the first portion and the second portion physically seal the sleeve from the outside environment. In the same or alternative embodiments, filler material within the sleeve can dampen the effects of impacts of the probes against other components and/or help thermally insulate the probe from the outside environment. Accordingly, the sleeves can help lower the costs associated with damage to probes of thermocouples and other components, such as downtime of the machinery. Further, because the sleeves cost less than some other components, such as thermocouples, the detachable nature of the first portion and second portion allow damaged sleeves to easily be removed and replaced.

The disclosure is not limited to the specific embodiments described herein, but rather, steps of the methods and/or elements of the systems may be utilized independently and separately from other steps and/or elements described herein. For example, the methods and systems are not limited to practice with only a turbine engine as described herein. Rather, the methods and systems may be implemented and utilized in connection with many other applications.

Although specific features of various embodiments may be shown in some drawings and not in others, this is for convenience only. Moreover, references to a particular embodiment in the above description are not intended to be interpreted as excluding the existence of additional embodiments that also incorporate the recited features. In accordance with the principles of the disclosure, any feature of a drawing may be referenced and/or claimed in combination with any feature of any other drawing.

This written description uses examples, including the best mode, to enable any person skilled in the art to practice the disclosure, including making and using any devices or systems and performing any incorporated methods. The patentable scope of the disclosure is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

What is claimed is:

1. A sleeve for a probe of an environment-sensing device, said sleeve comprising:
   a first portion comprising:
     a first inner surface;
     a first outer surface;
     a first body extending between said first inner surface and said first outer surface;
     at least one first body channel defined within said first body, said at least one first body channel comprising a filler material therein; and
     a first-portion projection extending axially along said first portion; and
   a second portion comprising:
     a second inner surface;
     a second outer surface;
     a second body extending between said second inner surface and said second outer surface;
     at least one second body channel defined within said second body, said at least one second body channel comprising said filler material therein; and
     a second-portion receiving channel extending axially along said second portion, wherein said first portion and said second portion are configured to couple together by mating said first-portion projection with said second-portion receiving channel, and wherein said second-portion receiving channel extends an entirety of an axial length of said second portion.

2. The sleeve of claim 1, wherein said first portion further comprises a second projection, wherein said second portion comprises a second receiving channel, and wherein said first portion and said second portion are further configured to couple together by mating said second projection with said second receiving channel.

3. The sleeve of claim 1, wherein said first portion further comprises a first-portion receiving channel extending axially along said first portion, wherein said second portion further comprises a second-portion projection extending axially along said second portion, and wherein said first portion and said second portion are further configured to couple together by mating said first-portion receiving channel with said second-portion projection.

4. The sleeve of claim 1, further comprising at least one first slot defined within said first portion and at least one second slot defined within said second portion, wherein said at least one first slot depends circumferentially from said first inner surface and comprises said filler material therein, and wherein said at least one second slot depends circumferentially from said second inner surface and comprises said filler material therein.

5. The sleeve of claim 1, wherein said first portion and said second portion comprise at least one of iron, zinc, cobalt, and nickel.

6. The sleeve of claim 1, wherein said at least one first body channel extends axially through said first body and a first axial length of said first portion from a first upper surface to a first base surface, and wherein said at least one second body channel extends axially through said second body and a second axial length of said second portion from a second upper surface to a second base surface.

7. The sleeve of claim 6, wherein said at least one first body channel comprises three body channels spaced circumferentially from each other along said first portion.

8. The sleeve of claim 1, wherein said filler material comprises at least one of ceramic, a polymer and metal-base material.

9. The sleeve of claim 8, wherein said filler material comprises a material capable of sustaining heat equal to or greater than 1100 degree Fahrenheit without melting.

10. A gas turbine comprising:
    an air compressor;
    a combustor;
    a turbine arranged in flow communication with said air compressor and said combustor along a flow path;
    a component arranged along said flow path; and
    a sleeve for said component, said sleeve comprising:
      a first portion comprising:
        a first inner surface;
        a first outer surface;
        a first body extending between said first inner surface and said first outer surface;
        a first-portion receiving channel extending axially along said first portion;
        at least one first body channel defined within said first body, said at least one first body channel comprising a filler material therein; and
        a first-portion projection extending axially along said first portion; and
      a second portion comprising:
        a second inner surface;
        a second outer surface;
        a second body extending between said second inner surface and said second outer surface;
        a second-portion projection extending axially along said second portion;
        at least one second body channel defined within said second body, said at least one second body channel comprising said filler material therein; and
        a second-portion receiving channel extending axially along said second portion, wherein said first portion and said second portion are mated together around said component with said first-portion projection extending into said second-portion receiving channel and with said first-portion receiving channel extending into said second-portion projection.

11. The gas turbine of claim 10, wherein said component comprises a thermocouple comprising a probe, and wherein said sleeve at least partially circumscribes said probe.

12. The gas turbine of claim 10, wherein said component is located fluidly downstream of said combustor.

13. The gas turbine of claim 10, further comprising at least one first slot defined within said first portion and at least one second slot defined within said second portion, wherein said at least one first slot depends circumferentially from said first inner surface and comprises said filler material therein, and wherein said at least one second slot depends circumferentially from said second inner surface and comprises said filler material therein.

14. The gas turbine of claim 10, said at least one first body channel extends axially through said first portion and comprises three body channels spaced circumferentially from each other along said first portion.

15. A method of installing a protective sleeve around a component of a gas turbine, the sleeve including a first portion and a second portion, the first portion having at least one first body channel defined therein and a first-portion projection extending axially along the first portion, the at least one first body channel including a filler material therein, the second portion having at least one second body channel and a second-portion receiving channel extending axially along the second portion, the at least one second body channel including the filler material therein, said method comprising:

mating the first-portion projection with the second-portion receiving channel, comprising slidably engaging the first-portion projection with the second-portion receiving channel while a first inner surface of the first portion is in contact with the component, thereby forming the protective sleeve; and placing the protective sleeve around the component such that an inner surface of the sleeve contacts the component.

16. The method of claim 15, further comprising placing a first inner surface of the first portion in contact with the component before mating the first-portion projection with the second-portion receiving channel.

17. The method of claim 15, further comprising mating a first-portion receiving channel with a second-portion projection, wherein the first-portion receiving channel extends an entirety of an axial length of the first portion, and wherein the second-portion projection extends axially along the second portion.

* * * * *